No. 696,119. Patented Mar. 25, 1902.
W. W. & F. N. TREVOR.
SAWING MACHINE.
(Application filed Aug. 17, 1901.)
(No Model.) 3 Sheets—Sheet 3.
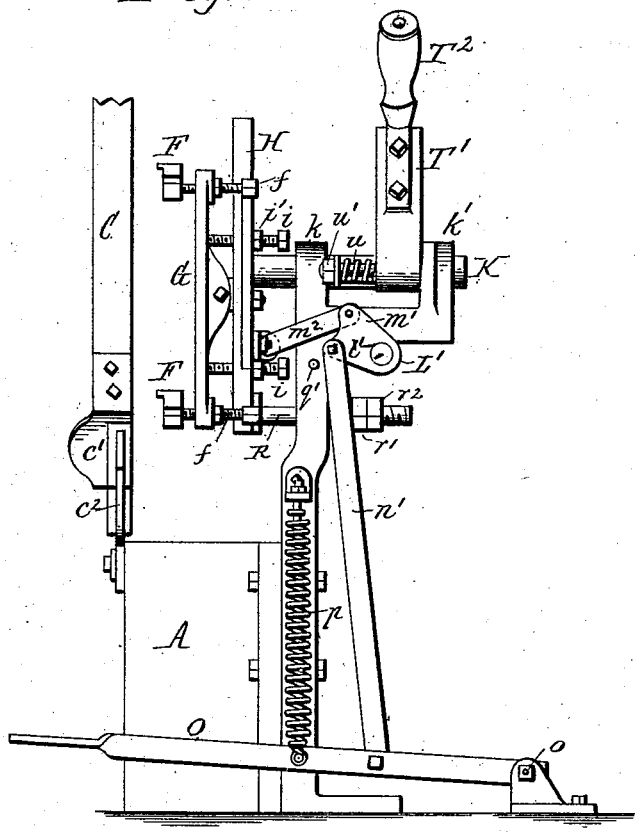
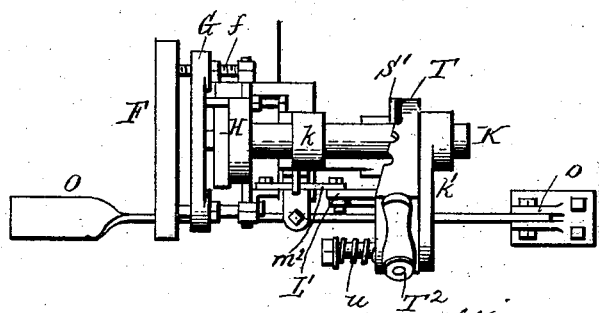

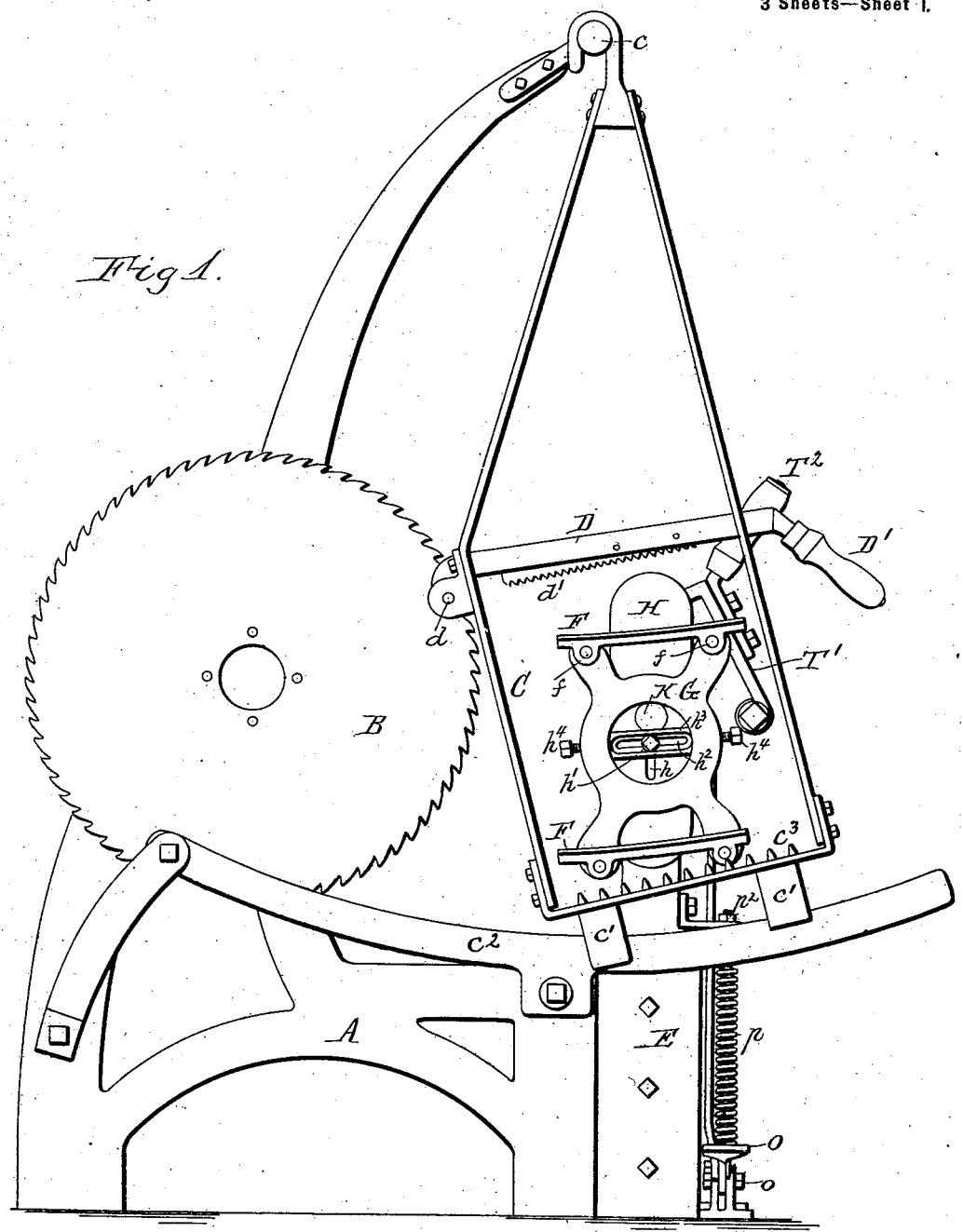

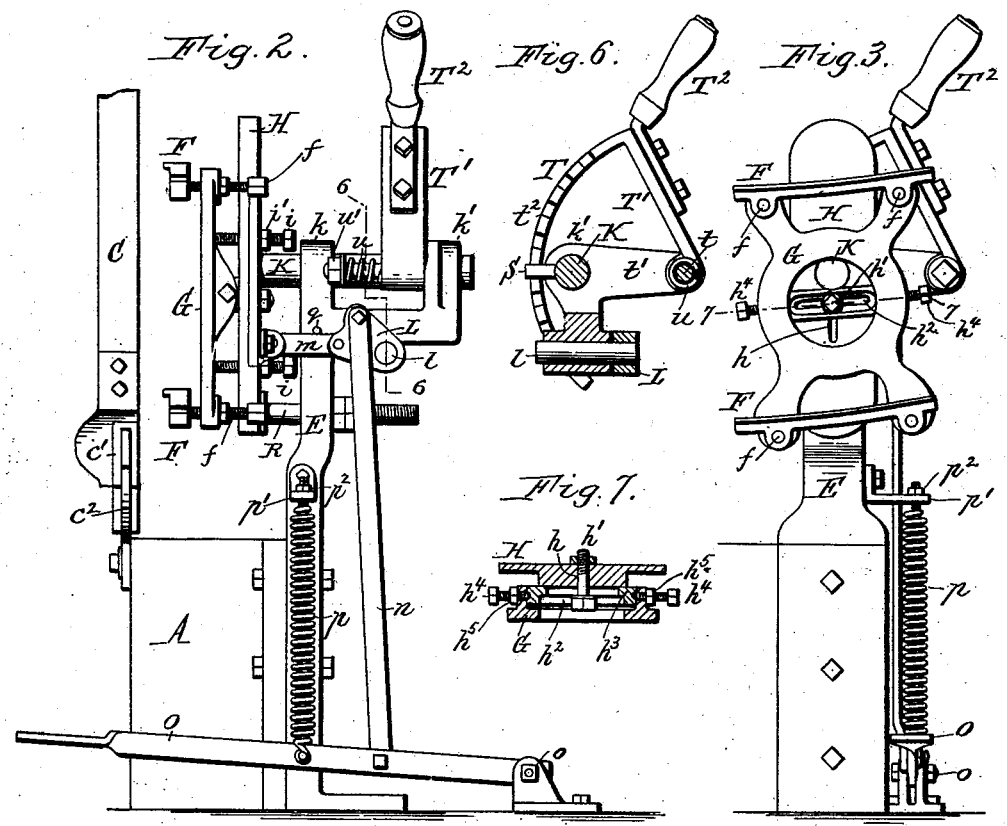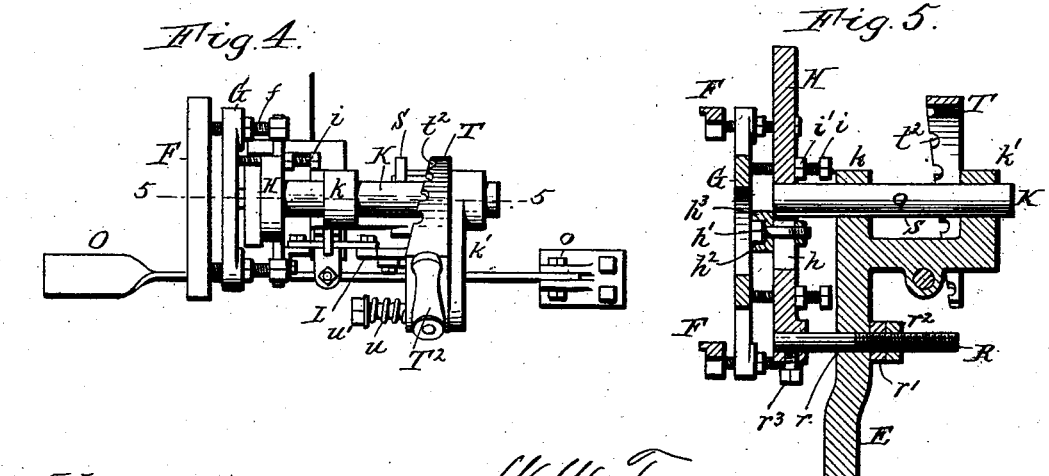

UNITED STATES PATENT OFFICE.

WILLIAM W. TREVOR AND FRANCIS N. TREVOR, OF LOCKPORT, NEW YORK.

SAWING-MACHINE.

SPECIFICATION forming part of Letters Patent No. 696,119, dated March 25, 1902.

Application filed August 17, 1901. Serial No. 72,354. (No model.)

*To all whom it may concern:*

Be it known that we, WILLIAM W. TREVOR and FRANCIS N. TREVOR, citizens of the United States, and residents of Lockport, in the county of Niagara and State of New York, have invented new and useful Improvements in Sawing-Machines, of which the following is a specification.

This invention relates to that well-known class of sawing-machines which embody a circular saw, a pendulous bolt-carriage which is swung to and fro by the operator for carrying the bolt against the saw and back, and a gage which is arranged on one side of the bolt-carriage and against which the bolt is pressed by the operator before each cutting movement of the bolt-carriage for producing a uniform thickness of the cut slabs. The gage in these sawing-machines is adjustable toward and from the bolt-carriage for regulating the thickness of the cut. It is, however, often desirable to cut off a slab of greater thickness for the purpose of removing an imperfect portion of the bolt—for instance, a knot—and in other cases it is desirable to cut off slabs of less thickness than those for which the gage is set.

The main object of this invention is to provide means for moving the gage quickly out of its normal position either from or toward the saw-carriage for taking a thicker or thinner cut than that for which the gage is set and returning the gage quickly to its normal position when such unusual cut has been taken.

Another object of the invention is to provide simple means for regulating the distance through which the gage can be moved out of its normal position and the thickness of the unusual or emergency cut produced thereby.

In the accompanying drawings, which illustrate so much of a sawing-machine as is necessary to understand the present invention and which consist of three sheets, Figure 1 is a side elevation of the sawing-machine. Fig. 2 is a front elevation of the gage mechanism of the machine with the shifting mechanism arranged to move the gage away from the carriage, the latter and other parts being removed. Fig. 3 is a side elevation of the gage mechanism viewed from the left in Fig. 2. Fig. 4 is a top plan view of the parts illustrated in Fig. 2. Fig. 5 is a vertical sectional elevation through the upper portion of the gage mechanism in line 5 5, Fig. 4. Fig. 6 is a transverse sectional elevation substantially on the line 6 6, Fig. 2. Fig. 7 is a horizontal sectional view on line 7 7, Fig. 3. Fig. 8 is a front elevation showing the gage-shifting mechanism arranged to move the gage toward the carriage. Fig. 9 is a top plan view thereof.

Like letters of reference refer to like parts in the several figures.

Referring to Figs. 1 to 7 of the drawings, A represents the stationary main frame of the machine, B the circular saw, and C the pendulous bolt-carriage hung from a pivotal support $c$ on the main frame. The lower portion of this carriage is provided with steadying lugs or projections $c'$, which engage a segmental guide $c^2$, carried by the main frame and substantially concentric with the pivotal support $c$. The lower portion of the bolt-carriage has the form of an open frame, in which the bolt to be sawed is placed, and is provided upon its bottom with projecting teeth $c^3$, which hold the bolt against slipping. D indicates a holding-lever pivoted to the bolt-carriage at $d$ and having teeth $d'$ to better grasp the bolt. This lever is provided with a handle D' and is taken hold of by the operator for holding the bolt in the carriage and swinging the latter toward and from the saw. Secured to the lower portion of the frame A, at or near the front thereof and on the rear side of the bolt-carriage, is a standard E, which carries the gage mechanism. The gage is composed, as usual, of upper and lower bars F, connected by horizontal adjusting-screws $f$ with an upright plate G, which is pivotally connected to a supporting-frame H, carried by the standard E. The plate G is pivotally, vertically, and horizontally adjustable on the frame H in any usual or preferred manner. For this purpose the frame H is provided with a vertical bolt-slot $h$, through which passes an adjusting-bolt $h'$, which also passes through a substantially horizontal bolt-slot $h^2$, provided in a block $h^3$. The plate G is pivotally secured to the block $h^3$ in any desired manner, as by means of pivot-bolts $h^4$, which are provided with clamping-nuts $h^5$. For holding the gage-plate G in its pivotal adjustment or for permitting the same to have a limited swing on its pivotal connection with the block set-screws $i$ are provided, which pass through screw-threaded holes in the frame H and are provided with lock-nuts $i'$. The pivotal adjustment of the gage-plate is employed when the machine is used for cutting shingles or slabs of wedge shape.

The parts thus far described are all of old and well-known construction.

In the use of the machine the operator places the bolt in the bolt-carriage and with one hand presses the holding-lever down to tightly grip and hold the bolt and by the same lever swings the carriage with the bolt rearwardly to the saw which cuts a slab or piece from the bolt, the thickness of which piece is determined by the position of the gage-bars. The holding-lever is then drawn forward to return the carriage and is then lifted to release the bolt, which is then moved by the operator's free hand into contact with the gage. The holding-lever is then again depressed and the carriage again swung toward the saw.

The gage-frame H is so mounted on the standard E that the frame and the gage members supported thereby can be moved bodily away from the bolt-carriage out of the normal position of the gage to a greater or less distance when it is desired to cut one or more slabs of greater thickness than those for which the gage is set—for instance, when a knot or other imperfection is encountered in the bolt—so that one or more cuts of unusual thickness can be made, and the gage can be returned with certainty to its normal position with reference to the line of cut when the normal cutting operation is to be resumed. For this purpose the following mechanism is employed:

The gage-frame H is provided with a laterally-extending shaft or rod K, which is rigidly secured to the frame and is mounted to slide horizontally toward and from the bolt-carriage in upwardly-projecting bearing-lugs $k\ k'$ on the upper end of the standard E.

L indicates an elbow-lever which is pivoted on a pivot-pin $l$, projecting from the upper part of the standard E. This lever has its lower arm connected by a link $m$ to the gage-frame H, so that by swinging the lever downwardly the link and the gage-frame will be drawn back or laterally away from the bolt-carriage. A suitable means for quickly swinging the lever to cause this lateral movement of the gage-frame is formed by a treadle O, pivoted at $o$ to a suitable pivotal block secured to the floor or other suitable support and extending to a position near the front side of the machine where the treadle can be easily reached by the foot of the operator. The treadle is connected to the upper arm of the lever L by a link or rod $n$. For returning the treadle and lever to their normal raised position a spring $p$ is employed, which connects the treadle to a suitable stationary part—for instance, a lug $p'$ on the standard. The spring is preferably provided with an adjusting-nut $p^2$.

$q$, Fig. 2, indicates a stop arranged on the standard E above the link $m$, connecting the lever with the gage-frame, in position to be engaged by the link for the purpose of limiting the upward movement thereof, and thus preventing the spring from throwing the lever beyond the required position.

The normal position of the gage-frame and the gage members supported thereby is fixed by a stop device, which allows the gage-frame to be freely moved out of its normal position to the unusual or emergency position and stops the return movement of the gage-frame when the latter has reached the normal position. This stop devce may be variously constructed. The construction represented in the drawings is as follows: Rigidly secured to the gage-frame H is a stop-rod R, Figs. 2 and 5, which is parallel with the supporting shaft or rod K and projects through an opening $r$ in the standard E. The rod R is screw-threaded at its rear end and is provided on the rear side of the standard with a stop-nut $r'$ and a lock-nut $r^2$ for the stop-nut. The rod R is preferably secured to the gage-frame by inserting the same in a hole therein and securing the rod in said hole by a set-screw $r^3$. The stop-nut $r'$ limits the return movement of the gage-frame by striking against the standard, and the gage is therefore always stopped and held in exactly the same position from which it was moved by the treadle. This position can be adjusted as desired by moving the stop-nut $r'$ to the necessary position on the rod R. The latter also supplements the shaft K in guiding the gage-frame in its sliding movement toward and from the bolt-carriage.

For the purpose of regulating the extent of the movement of the gage-frame away from the bolt-carriage in order that an unusual cut of greater or less thickness may be made the following instrumentalities are employed: The shaft or rod K is provided between the bearing-lugs $k\ k'$ with a laterally-projecting stop-pin or projection S, which in the backward movement of the gage-frame is adapted to strike against an adjustable segmental or arc-shaped wedge T. The latter is carried by an arm T', which is pivoted at $t$ to a pivot-pin projecting horizontally from an arm $t'$, secured to the rear bearing-lug $k'$. $T^2$ indicates a handle, by means of which said wedge is moved. The wedge is substantially concentric with its pivot, and by swinging the same thereon any desired portion of the wedge may be brought in the path of the stop-pin S. When a thin portion of the wedge is in position to be engaged by the stop-pin, a greater emergency movement of the gage-frame is permitted than when a thicker portion of the wedge is in this position. This swinging wedge therefore provides a convenient adjustable regulating-stop for determining the extent of the unusual or emergency movement of the gage away from the bolt. The wedge T is preferably provided along its face with shallow recesses or notches $t^2$, with either of which the stop-pin is adapted to engage, according to the position of the wedge. For the purpose of holding the wedge in its adjusted position when the stop is not in engagement with one of said notches a friction-spring $u$ is provided, which surrounds a projecting part of the pivot-pin of the wedge and is confined between the wedge-arm T' and a holding and adjusting nut $u'$, secured on the end of said pivot.

In using the machine, as before explained, the gage is stationary, and pieces or slabs of the same thickness are cut from the bolt at each movement thereof to the saw. When in the course of this operation an imperfection is encountered in the bolt, or it is for any other reason desired to cut a thicker piece, it is only necessary to depress the treadle, which, through the mechanism described, throws the gage bodily away from its normal position until it is stopped by the wedge. Upon releasing the treadle the gage is returned by the spring until the stop-nut $r'$ encounters the standard, when the gage will be arrested in its normal position or that position which it occupied before being moved to the emergency or unusual position.

In Figs. 8 and 9 the gage-shifting mechanism is arranged to move the gage out of its normal position toward the bolt-carriage for cutting one or more slabs of less thickness than the normal and then returning the gage to its normal position. In this construction of the gage mechanism the elbow-lever L' has its lower arm $l'$ pivoted to the link $n'$, which connects with the treadle, while the upper arm $m'$ of the lever is pivoted to the link $m^2$, which connects with the gage-frame H. By swinging the lever L' downwardly the link $m^2$ and gage-frame are pushed forwardly toward the bolt-carriage. In this arrangement of the mechanism the stop-pin S' fixes the normal position of the gage by bearing against the wedge T, as shown in Fig. 9, while the stop device, which limits the forward movement of the gage-frame, such as the stop-nut $r'$, fixes the abnormal position of the gage. The stop-nut $r'$ is adjusted on the rod R away from the standard E, and the stop $q'$, if it is used, is placed on the standard below the link $m^2$. The depression of the treadle throws the gage bodily from its normal position toward the bolt-carriage until it is arrested by the stop-nut $r'$. Upon releasing the treadle the gage is returned by the spring $p$ until the pin S' encounters the arc-shaped wedge, when the gage is stopped in its normal position.

We claim as our invention—

1. The combination of a saw, a bolt-carriage, a gage movable bodily toward and from the bolt-carriage, mechanism for moving the gage out of a normal position with reference to the line of cut and the bolt-carriage and for returning the gage to this normal position, and means for stopping the return movement when the gage reaches said normal position, substantially as set forth.

2. The combination of a saw, a bolt-carriage, a gage movable bodily toward and from the bolt-carriage, means for moving the gage out of a normal position with reference to the line of cut and the bolt-carriage, means for returning the gage, and a stop to limit said return movement, substantially as set forth.

3. The combination of a saw, a bolt-carriage, a gage movable toward and from the bolt-carriage, a lever connected to said gage, a treadle connected to said lever for moving the gage in one direction, a spring for returning said gage, and a stop for limiting said return movement, substantially as set forth.

4. The combination of a saw, a bolt-carriage, a gage movable bodily toward and from the latter, a stop for fixing the normal position of the gage with reference to the line of cut and the bolt-carriage, means for shifting the gage bodily to an abnormal position, a stop for fixing this abnormal position of the gage, and means for returning the gage to its normal position, substantially as set forth.

5. The combination of a saw, a bolt-carriage, a stationary frame, a gage-frame mounted in said stationary frame to move bodily toward and from said carriage, gage members adjustably attached to said gage-frame, means for moving said gage-frame and the gage members carried thereby bodily in one direction, means for returning the gage-frame, and means for arresting the return movement of the gage-frame in the normal position of the latter, substantially as set forth.

6. The combination of a saw, a bolt-carriage, a stationary frame, a gage provided with a horizontal rod which is capable of sliding in said stationary frame, a lever pivoted to said stationary frame, a link connecting the lever with said gage-frame, a treadle for moving said gage out of a normal position, a link connecting the treadle with said lever, means for returning said gage, and means for stopping the return movement of the gage when said normal position is reached, substantially as set forth.

7. The combination with a stationary frame, a saw, a bolt-carriage, a gage slidably mounted on said frame to move toward and from said carriage, a lever pivoted on said frame, a link connecting said lever and said gage, a treadle connected to said lever for moving said gage away from the carriage, means for returning said gage, a rod connected to said gage and passing through an opening in a part of said frame, and an adjusting-stop carried by said rod and adapted to engage said frame to limit the return movement of the gage, substantially as set forth.

8. The combination of a saw, a bolt-carriage, a gage movable bodily toward and from said bolt-carriage, means for moving the gage away from said carriage, an adjustable stop device for limiting the movement away from the carriage, means for returning the gage, and a stop for limiting said return movement, substantially as set forth.

9. The combination of stationary frame, a saw, a bolt-carriage, a gage movably mounted on said frame to move toward and from said bolt-carriage and provided with a stop, a regulating-wedge for determining the movement of said gage, said wedge being movable in the path of said stop, and means for holding said regulating-wedge in its adjusted position, substantially as set forth.

10. The combination of a stationary frame, a saw, a bolt-carriage, a gage movably mounted on said frame to move toward and from said bolt-carriage, a pivoted regulating-wedge for determining the movement of said gage, a stop carried by said gage, said wedge being arc-shaped and movable in the path of said stop, and means for holding said regulating-wedge in its adjusted position, substantially as set forth.

Witness our hands this 15th day of August, 1901.

WILLIAM W. TREVOR.
FRANCIS N. TREVOR.

Witnesses:
M. L. WEBSTER,
H. F. CUSHMAN.